United States Patent [19]

Ukai et al.

[11] Patent Number: 5,576,858
[45] Date of Patent: Nov. 19, 1996

[54] GRAY SCALE LCD CONTROL CAPACITORS FORMED BETWEEN A CONTROL CAPACITOR ELECTRODE ON ONE SIDE OF AN INSULATING LAYER AND TWO SUBPIXEL ELECTRODES ON THE OTHER SIDE

[75] Inventors: Yasuhiro Ukai, Kobe; Tomihisa Sunata, Miki; Toshiya Inada, Akashi, all of Japan

[73] Assignee: Hosiden Corporation, Osaka, Japan

[21] Appl. No.: 534,885

[22] Filed: Sep. 27, 1995

Related U.S. Application Data

[63] Continuation of Ser. No. 66,143, Jun. 1, 1993, abandoned.

[30] Foreign Application Priority Data

Oct. 14, 1991 [JP] Japan .................................. 3-264561

[51] Int. Cl.⁶ .......................... G02F 1/136; G02F 1/1343
[52] U.S. Cl. ................................................. 359/59; 359/87
[58] Field of Search ............................ 359/54, 58, 59, 359/82, 87, 88

[56] References Cited

U.S. PATENT DOCUMENTS

| | | | |
|---|---|---|---|
| 4,040,720 | 8/1977 | York | 359/54 |
| 4,403,217 | 9/1983 | Becker et al. | 359/58 |
| 4,639,087 | 1/1987 | Cannella | 359/87 |
| 4,728,172 | 3/1988 | Cannella | 359/87 |
| 5,042,918 | 8/1991 | Suzuki | 359/87 |
| 5,126,865 | 6/1992 | Sarma | 359/87 |
| 5,182,661 | 1/1993 | Ikeda et al. | 359/54 |
| 5,245,450 | 9/1993 | Ukai et al. | 359/59 |

FOREIGN PATENT DOCUMENTS

| | | | |
|---|---|---|---|
| 0369621 | 5/1990 | European Pat. Off. | |
| 0493798 | 7/1992 | European Pat. Off. | 359/87 |
| 62-25728 | 3/1987 | Japan | 359/87 |
| 62-150326 | 7/1987 | Japan | 359/88 |
| 2124536 | 5/1990 | Japan | 359/54 |

OTHER PUBLICATIONS

IBM Technical Disclosure Bulletin, "Thin Film Transistor for Gray Scale LCD", vol. 33, No. 1A, Jun. 1990, pp. 481–482.

*Primary Examiner*—Anita Pellman Gross
*Assistant Examiner*—Walter J. Malinowski
*Attorney, Agent, or Firm*—Pollock, Vande Sande & Priddy

[57] ABSTRACT

In a gray-scale liquid crystal display panel of the type wherein first and second transparent substrates (1, 5) are disposed in parallel with liquid crystal (7) sealed in a space defined therebetween, the second substrate (5) is coated all over its inside surface with a transparent common electrode (6) and the first substrate (1) has on its inside surface pixels arranged in a matrix form and thin film transistors (8) each provided near one of the pixels, the pixels each include first and second spaced-apart subpixel electrodes ($4_1, 4_2$) formed on one side of an insulating layer (15) provided on the inside surface of the first substrate and a control capacitor electrode (2) formed on the other side of the insulating layer and covering the gap (GP) and overlapping the first and second subpixel electrodes ($4_1, 4_2$) over predetermined areas thereof. The first subpixel electrode ($4_1$), the control capacitor electrode (2) and the second subpixel electrode ($4_2$) constitute first, second and third liquid crystal capacitors ($C_{LC1}, C_{LC2}, C_{LC3}$) between them and the common electrode (6) facing them. The first subpixel electrode ($4_1$) and the control capacitor electrode (2) are coupled via a first control capacitor ($C_{LC1}$), and the control capacitor electrode (2) and the second subpixel electrode ($4_2$) are coupled via a second control capacitor ($C_{LC2}$). The drain electrode of the thin film transistor is connected directly to the first subpixel electrode.

2 Claims, 6 Drawing Sheets

GRAY SCALE LCD CONTROL CAPACITORS FORMED BETWEEN A CONTROL CAPACITOR ELECTRODE ON ONE SIDE OF AN INSULATING LAYER AND TWO SUBPIXEL ELECTRODES ON THE OTHER SIDE

This application is a continuation of Ser. No. 08/066,143, filed on Jun. 1, 1993 now abandoned.

TECHNICAL FIELD

The present invention relates to a gray scale liquid crystal display panel which has each pixel of the display composed of a plurality of subpixels and which is capable of providing a gray scale display.

BACKGROUND ART

In a liquid crystal display panel disclosed in U.S. Pat. No. 4,840,460 each pixel electrode, which faces a common electrode across a liquid crystal interposed therebetween, is divided into a plurality of subpixel electrodes of the same area, and control capacitor electrodes are provided each of which has a different area and faces one of the divided subpixel electrodes across an insulating layer sandwiched therebetween. The control capacitor electrodes in each pixel are interconnected electrically. Each control capacitor electrode and the subpixel electrode disposed opposite it across the insulating layer constitute a control capacitor, and the subpixel electrode and the common electrode facing it across the liquid crystal constitute a liquid crystal capacitor. These two capacitors are connected in series to each other. A drive voltage which is applied to a control electrode is divided by the two capacitors. The liquid crystal capacitors have the same capacity but all the control capacitors have different capacities. On this account, even if a voltage is applied to all the control capacitor electrodes in common to them, the liquid crystal capacitors are each supplied with a different capacitance-divided voltage. The threshold voltage of the liquid crystal (i.e. a voltage which is applied to the liquid crystal when the transmission of light through the liquid crystal display panel begins) is substantially constant all over the display panel. Hence, by controlling the voltage which is applied to the control capacitor electrodes, it is possible to control the numbers of subpixel electrodes from which capacitance-divided voltages higher and lower than the threshold voltage, respectively, are applied to the liquid crystal, and consequently, the divided regions of the pixel can be driven stepwise.

In the case of applying the liquid crystal display panel to a picture display including a gray level as in television, the drive voltage that is applied to each pixel of the liquid crystal display may take various values or magnitudes within a certain voltage range in accordance with the picture signal level. In a liquid crystal display panel of the type wherein each pixel is not divided into subpixels, as the drive voltage increases, a gray-level display is produced through utilization of a sloping range of a light transmittance curve from the rise to saturation of the transmittance of each pixel region. In the slope region of the light transmittance curve liquid crystal molecules are oriented obliquely to the substrate. Since the visual angle dependence of the light transmittance is large in this case, a proper angle of field for such a liquid crystal display panel is generally very small.

In the conventional liquid crystal display panel wherein each pixel is composed of a plurality of subpixels and the subpixels are supplied with voltages which differ in a sequential order as described in the aforementioned U.S. patent, however, the transmission of light through one subpixel region reaches saturation through the above-mentioned sloping range of the transmittance curve after starting as the drive voltage is increased, and then the transmission of light through another subpixel region similarly reaches saturation through the sloping range. In this way, the respective subpixel regions reach the saturation range through the sloping range of the light transmittance curve one after another. Hence, in the state of providing a display at an arbitrary gray level, the liquid crystal molecules are oriented obliquely to the substrate in one subpixel region at most but in the other subpixel regions the liquid crystal molecules are oriented vertically or horizontally to the substrate. By decreasing the number of subpixel regions in which the liquid crystal molecules are oriented obliquely to the substrate in the gray-level display as mentioned above, the area of a large visual angle dependence in the pixel region is reduced, and consequently, the average visual angle dependence of the entire pixel region can be reduced.

With the pixel structure disclosed in the U.S. patent, however, the subpixel electrodes are each separated by a gap or region to which no voltage can be applied, i.e. a region which does not contribute to the display—this reduces the aperture ratio accordingly. With a view to overcoming this defect, the inventors of the subject application proposed, in their prior U.S. patent application Ser. No. 07/733,177 filed Jul. 19, 1991, now U.S. Pat. No. 5,245,450 issued Sep. 14, 1993, a pixel structure wherein subpixel electrodes and a control capacitor electrode are formed so that they cover the gap between the subpixels and overlap the subpixels over desired areas, one of the subpixel electrodes and the control capacitor electrode are connected through a contact hole made in an insulating layer and the drive voltage is applied directly to the said one subpixel electrode to apply substantially equal voltage to the liquid crystal in the subpixel and the gap region, thereby providing for increased aperture ratio of the pixel. The pixel electrode will be described with reference to FIGS. 1 and 2.

Figure 1:
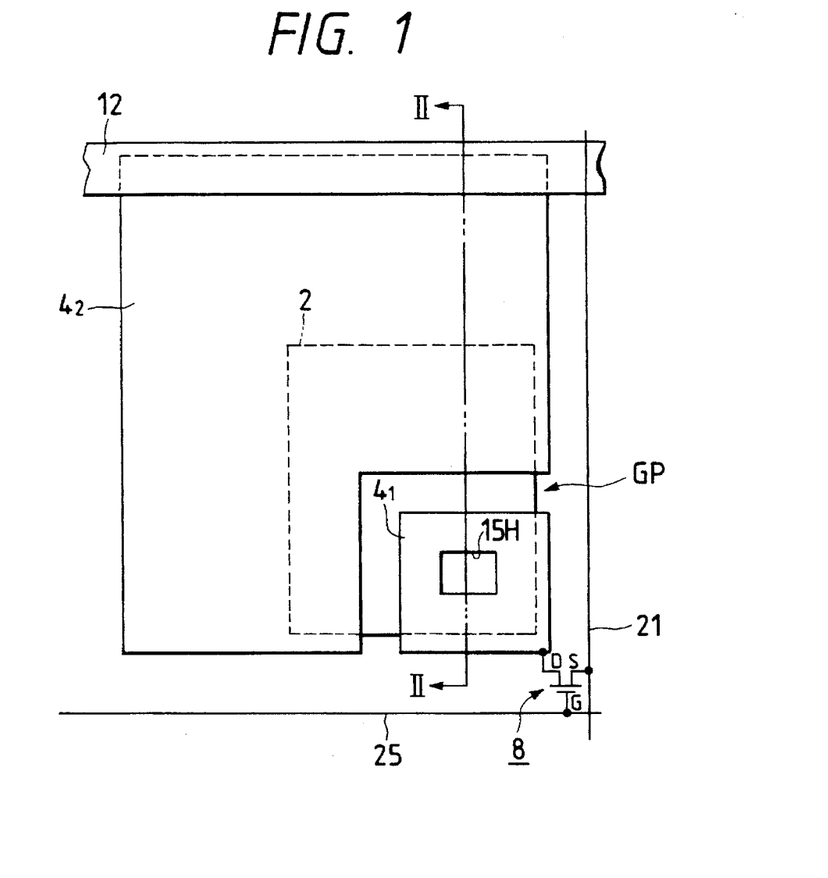
FIG. 1 is a plan view of a pixel region composed of a plurality of subpixels and capable of producing a gray-scale display.
Figure 2:
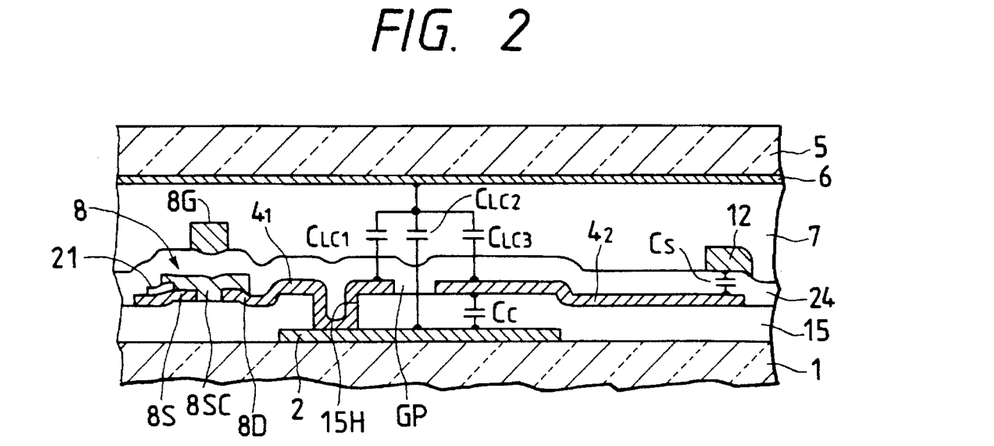
FIG. 2 is a sectional view taken on the line II—II in FIG. 1.

FIG. 1 is a plan view showing one pixel region of a liquid crystal display panel of the type having pixels arranged in a matrix form, and FIG. 2 is a sectional view taken on the line II—II in FIG. 1. Reference numeral 1 indicates a transparent substrate as of transparent glass, on the interior surface of which there is formed a control capacitor electrode 2, which is, in turn, covered with an insulating layer 15 deposited almost all over the interior surface of the substrate 1. On the top of the insulating layer 15 there is formed a subpixel electrode $4_2$ with one corner of the pixel region cut off in a square form, and in the void area there is provided a rectangular subpixel electrode $4_1$ separated by a gap GP from the subpixel electrode $4_2$. The insulating layer 15 has a contact hole 15H made therethrough substantially at the center of the subpixel electrode $4_1$, the control capacitor electrode 2 and the subpixel electrode $4_1$ being interconnected through the contact hole 15H. Reference numeral 8 denotes a symbol indicating a thin film transistor provided near the subpixel electrode $4_1$. In FIG. 2 its construction is shown in section.

A gate insulating film 24 of the transistor 8 is deposited substantially all over the interior surface of the substrate 1, covering the pixel electrodes $4_1$ and $4_2$ and a semiconductor layer 8SC of the transistor 8. The transistor 8 has its source electrode 8S and gate electrode 8G connected to a source line 21 and a gate line 25 shown symbolically in FIG. 1, respectively. Reference numeral 5 represents a transparent substrate as of transparent glass, which is coated all over its interior surface with a common electrode 6. Reference numeral 12 denotes a strip-like additional capacitor electrode, which is deposited opposite a part of the subpixel electrode $4_2$ with the gate insulating film 24 sandwiched between them. The additional capacitor electrodes 12 of all pixels are supplied with a common potential. Between the common electrode 6 and the gate insulating film 24 there is sealed liquid crystal 7. Incidentally, the control capacitor electrode 2, the subpixel electrodes $4_1$, $4_2$ and the common electrode 6 are transparent electrodes as of ITO. The subpixel electrode $4_1$ has connected thereto a drain electrode 8D of the thin film transistor 8 provided in its vicinity and a voltage Va corresponding to the picture signal level is applied to the subpixel electrode $4_1$ via the drain electrode 8D.

Figure 3:
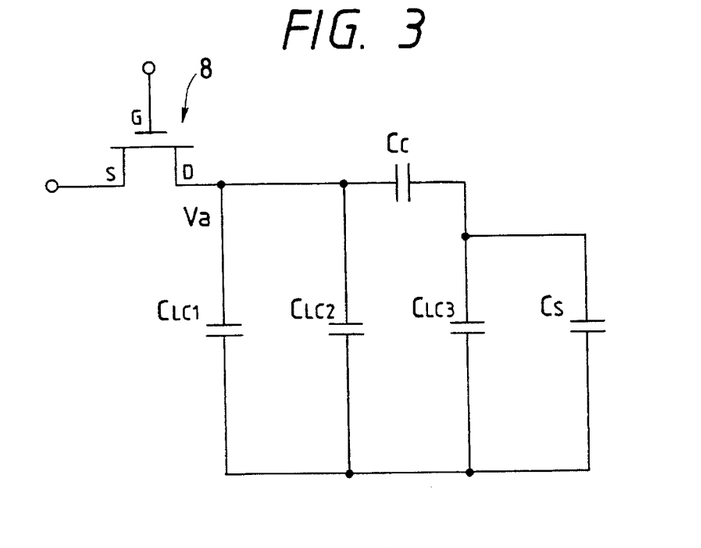
FIG. 3 shows an equivalent circuit of the pixel depicted in FIG. 1.

The pixel of such a construction as depicted in FIGS. 1 and 2 is composed of a subpixel formed by the subpixel electrode $4_1$ and the gap region GP of the control capacitor electrode 2 connected thereto, and a subpixel formed by the subpixel electrode $4_2$. As shown in FIG. 2, liquid crystal capacitors $C_{LC1}$, $C_{LC3}$ and $C_{LC2}$ are formed between the common electrode 6 and the subpixel electrodes $4_1$, $4_2$ and the control capacitor 2, respectively, a control capacitor electrode $C_C$ is formed between the control capacitor electrode 2 and the subpixel electrode $4_2$, and an additional capacitor $C_S$ is formed between the additional capacitor electrode 12 and the subpixel electrode $4_2$. FIG. 3 shows an equivalent circuit of the pixel depicted in FIG. 1.

The drive voltage Va supplied via the drain electrode 8D of the thin film transistor 8 is applied intact to the subpixel electrode $4_1$, whereas the subpixel electrode $4_2$ is supplied with a voltage divided by the sum of the capacitances of the liquid capacitor $C_{LC3}$ and the additional capacitor $C_S$ and the capacitance of the control capacitor $C_C$. This capacitance-divided voltage is controlled by suitably selecting the capacitance value of the control capacitor $C_C$, i.e. the overlapping area of the subpixel electrode $4_2$ and the control capacitor electrode 2, and the area of the additional capacitor electrode 12. The liquid crystal panel has a threshold voltage at which the transmission of light begins (i.e. the panel is turned ON) and a voltage at which the transmission of light is saturated. By gradually increasing the drive voltage Va from a low starting voltage, the transmission of light through the regions of the subpixel $4_1$ and the gap GP begins (i.e. these regions are turned ON) at a certain threshold voltage, and by further increasing the voltage Va, the quantity of light that is transmitted through the regions gradually increases. By further increasing the drive voltage Va, the region of the subpixel $4_2$ is also turned ON and the transmission therethrough of light is finally saturated, that is, all pixel regions enter the state in which the quantity of light passing therethrough is maximum. By changing the voltage to be applied to each subpixel electrode through such control of drive voltage Va, a gray-scale display can be produced.

The liquid crystal display panel of U.S. Pat. No. 5,245,450, shown in FIGS. 1 and 2, adopts the construction in which the drive voltage Va is applied directly to the subpixel electrode $4_1$ via the thin film transistor 8 and the subpixel electrode $4_1$ is connected directly to the control capacitor electrode 2 through the contact hole 15H made in the insulating layer 15. In the case where two subpixel electrodes are used as in the above-mentioned example, if the control capacitor electrode 2 and the subpixel electrode $4_2$ are shorted, the subpixel electrode $4_2$ is also supplied with the same drive voltage Va as that applied to the subpixel electrode $4_1$. Hence, even if a drive voltage is applied which causes, for example, the subpixel electrode $4_1$ and the gap region GP to produce a gray-level display, the display is provided at the same level over the entire region of the pixel, including the subpixel electrode $4_2$. In this case, the quantity of light passing through the pixel is larger than in the case of no short occurring between the above-mentioned electrodes, and the pixel is perceived as being defective rather than normal. In addition, since the liquid crystal molecules are oriented obliquely over the entire region of the pixel, the visual angle dependence of the liquid crystal display panel increases, and when the display panel is applied to a color display, the pixel becomes a defective pixel which clearly differs in color and saturation than in the case where no short occurs.

The above description has been given of the light transmitting type liquid crystal display panel but the same is true of a reflecting type liquid crystal display panel wherein the subpixel electrodes $4_1$, $4_2$ and the control capacitor electrode 12 are formed by metal layers.

It is therefore an object of the present invention to provide a gray-scale liquid crystal display panel which has display pixels of a large aperture ratio.

Another object of the present invention is to provide a gray-level liquid crystal display panel which has display pixels such that the visual angle dependence does not appreciably increase even if one of the subpixel electrodes and the control capacitor electrode are shorted.

SUMMARY OF THE INVENTION

The gray-scale liquid crystal display panel according to the present invention has a construction wherein first and second transparent substrates are disposed opposite one another in parallel with liquid crystal interposed therebetween, the first substrate has on the inside thereof pixels arranged in a matrix form, thin film transistors each connected to one of the pixels, source lines each connected to the sources of the thin film transistors of each column for supplying a drive voltage to the thin film transistors and gate lines each connected to the gates of the thin film transistors of each row for supplying the thin film transistors with a gate signal for their ON-OFF control, and the second substrate is coated over the entire area of its interior surface with a transparent common electrode facing all of the pixels. Each of the pixels includes a transparent insulating layer deposited over the first substrate, at least two subpixel electrodes formed apart on one side of the insulating layer, and at least one control capacitor electrode formed on the other side of the insulating layer, covering substantially the entire area of the gap between the two subpixel electrodes and predetermined areas of the subpixel electrodes. The control capacitor electrode and the two subpixel electrodes constitute control capacitors across the insulating layer. The source and drain electrode of each thin film transistor, connected to one of the pixels, are connected directly to one of the two subpixel electrodes.

With such a pixel structure as mentioned above, the aforementioned capacitance-divided voltage can be applied to the control capacitor electrode and the gap region between the subpixel electrodes can also be made to contribute to producing a display; hence, the aperture ratio of each pixel increases accordingly. Moreover, even if a short occurs between either one of the two subpixel electrodes and the control capacitor electrode, the subpixel electrodes can be driven stepwise because they are capacitively connected to each other by the other control capacitor, and the visual angle dependence does not appreciably increase.

DESCRIPTION OF THE PREFERRED EMBODIMENTS

Figure 4:
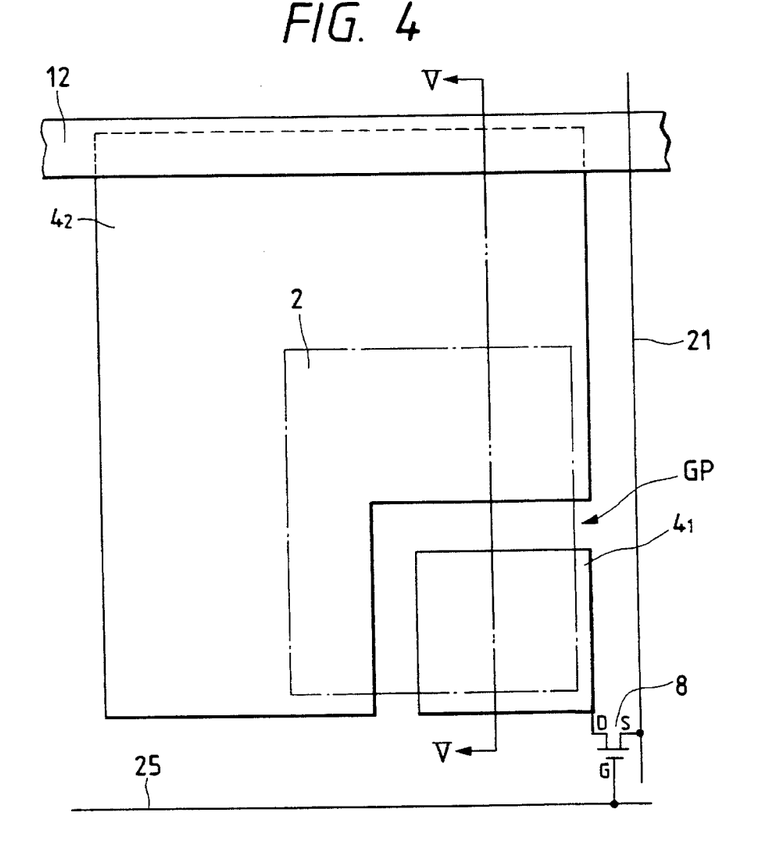
FIG. 4 is a plan view illustrating the pixel structure of the liquid crystal display panel according to the present invention.
Figure 5:
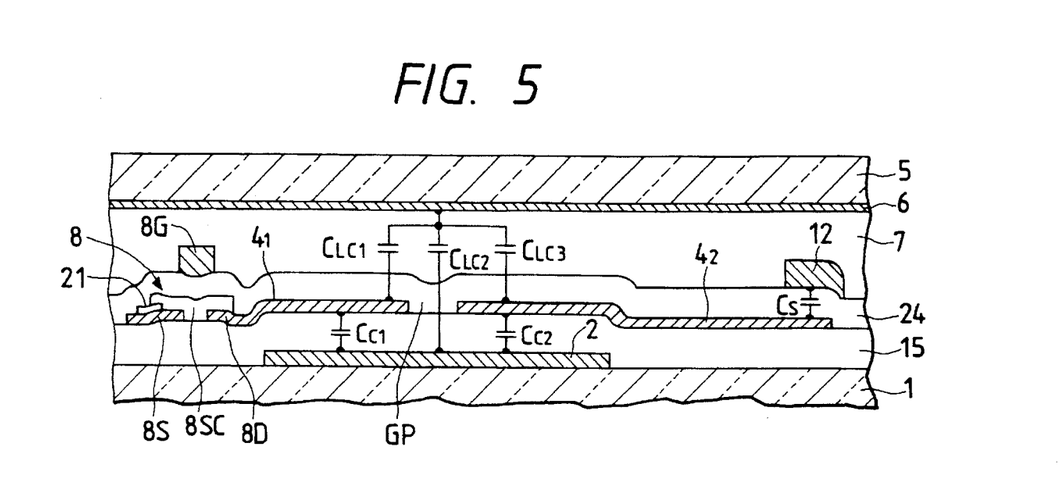
FIG. 5 is a sectional view taken on the line V—V in FIG. 4.

Referring now to FIGS. 4 and 5, an embodiment of the present invention will be described. FIG. 4 is a plan view of one pixel region in a liquid crystal display panel provided with display pixels arranged in a matrix form, and FIG. 5 a sectional view taken on the line V—V in FIG. 4. Reference numeral 1 indicates a transparent substrate as of transparent glass. On the interior surface of the transparent substrate 1 there is formed at one corner of a rectangular pixel a rectangular control capacitor electrode 2 smaller than the pixel, and the control capacitor electrode 2 is covered with a first insulating layer 15 coated almost all over the interior surface of the substrate 1. On the top of the insulating layer 15 there are deposited subpixel electrodes $4_1$ and $4_2$ separated by a gap GP. The control capacitor electrode 2 covers substantially the entire area of the gap GP and predetermined areas of the subpixel electrodes $4_1$ and $4_2$, forming control capacitors $C_{C1}$ and $C_{C2}$ between the control capacitor electrode 2 and the subpixel electrodes $4_1$ and $4_2$, respectively.

A source electrode 8S of each thin film transistor 8, a source line 21 for interconnecting the source electrodes 8S of the thin film transistors 8 of each column, a drain electrode 8D of each thin film transistor 8 connected to the subpixel electrode 41, and a semiconductor layer 8SC are formed on the same side of the first insulating layer 15 as the side where the subpixel electrodes $4_1$ and the $4_2$ are provided. A second insulating layer 24 is deposited almost all over the interior surface of the substrate 1, covering them. The second insulating layer 24 is used also as a gate insulating film common to all of the thin film transistors 8. On the gate insulating film 24 there are formed a gate electrode 8G facing the semiconductor layer 8SC, a strip-like additional capacitor electrode 12 extending along the marginal portion of the subpixel electrode $4_2$, and a gate line 25 for interconnecting the gate electrodes 8G of the thin film transistors 8 of each row. The additional capacitor electrode 12 constitutes an additional or supplemental capacitor $C_S$ between it and the subpixel electrode $4_2$. A transparent substrate 5, facing the substrate 1 across liquid crystal 7 sealed in the space defined therebetween, is coated over the entire area of its inside surface with a transparent common electrode 6. Consequently, liquid crystal capacitors $C_{LC1}$ and $C_{LC2}$ are formed between the subpixel electrodes $4_1$ and $4_2$ and the common electrode 6, respectively, and another liquid crystal capacitor $C_{LC3}$ is formed between the control capacitor electrode 2 and the common electrode 6 in the gap region GP. The control capacitor electrode 2, the subpixel electrodes $4_1$ and $4_2$, the common electrode 6 and the additional capacitor electrode 12 are transparent electrodes made of ITO, for instance.

Figure 6:
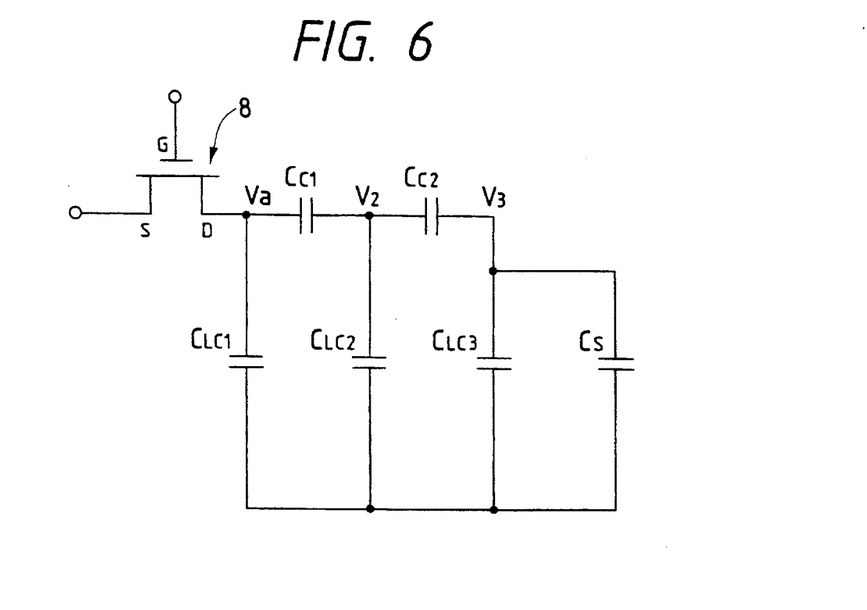
FIG. 6 is a diagram showing an equivalent circuit of each pixel of the liquid crystal display panel according to the present invention.

In this embodiment, such a contact hole 15H as referred to previously with respect to the pixel of FIG. 1 is not made in the first insulating layer, but instead the drain electrode 8D of the thin film transistor 8 is connected directly to the subpixel electrode $4_1$ and the control capacitor electrode 2 and the subpixel electrode $4_1$ are capacitively coupled by the control capacitor $C_{C1}$ formed between them. Hence, the equivalent circuit of the pixel shown in the embodiment of FIGS. 4 and 5 is such as depicted in FIG. 6, wherein the liquid crystal capacitors $C_{LC1}$, $C_{LC2}$ and $C_{LC3}$ are connected to the drain D of the thin film transistor 8 directly, via the control capacitor $C_{C1}$, and via the control capacitors $C_{C1}$ and $C_{C2}$, respectively. Thus, the drive voltage Va which is provided via the thin film transistor 8 is applied intact across the liquid crystal capacitor $C_{LC1}$. Setting $C_{LC3}'=C_{LC3}+C_S$, the liquid crystal capacitor $C_{LC2}$ is supplied with a voltage $V_2$ resulting from the capacitance division of the voltage Va, expressed by the following equation:

$$V_2 = \frac{\frac{C_{LC3}'}{C_{C2}} + 1}{\left(\frac{C_{LC2}}{C_{C1}} + 1\right)\left(\frac{C_{LC3}'}{C_{C2}} + 1\right) + \frac{C_{LC3}'}{C_{C1}}} Va \quad (1)$$

The liquid crystal capacitor $C_{LC3}$ is supplied with a voltage $V_3$ resulting from the capacitance division of the thus divided voltage $V_2$, expressed by the following equation:

$$V_3 = \frac{1}{\left(\frac{C_{LC2}}{C_{C1}} + 1\right)\left(\frac{C_{LC3}'}{C_{C2}} + 1\right) + \frac{C_{LC3}'}{C_{C1}}} Va \quad (2)$$

Accordingly, the applied voltages decrease one after another. That is, in this pixel the region of the gap GP of the control capacitor electrode 2 forming the liquid crystal capacitor $C_{LC2}$ also functions as a subpixel—this structure is equivalent to a structure in which one pixel is divided into three subpixels. Incidentally, the respective additional capacitor electrodes 12 are supplied with a common fixed potential via a line not shown, and the additional capacitor $C_S$ is connected in parallel to the liquid crystal capacitor $C_{LC3}$ equivalently. The additional or supplemental capacitance $C_S$ is provided to increase the amount of charges stored in each pixel to lengthen the time for which the pixel remains in the display state.

Figure 7:
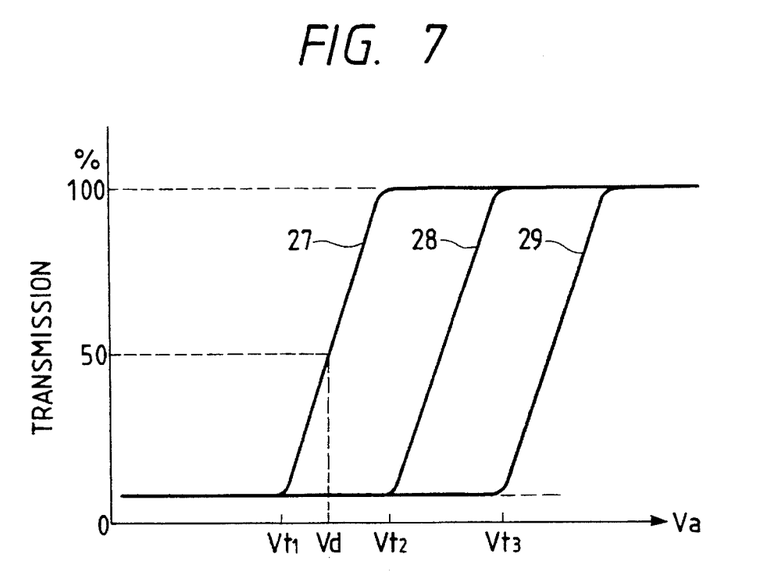
FIG. 7 is a graph for explaining an example of the light transmittance characteristic of each liquid crystal capacitor with respect to the drive voltage Va in the pixel depicted in FIGS. 4 and 5.

The areas over which the control capacitor electrode 2 overlaps the subpixel electrodes $4_1$ and $4_2$ (and consequently the capacitances of the control capacitors $C_{C1}$ and $C_{C2}$) are determined so that operations curves, each showing the quantity of light transmitted through one of the liquid crystal capacitors $C_{LC}$ (the saturated quantity of transmitted light being indicated by 100%), bear such relationships as depicted in FIG. 7. That is, the above-said overlapping areas are selected such that when a voltage $V_{t2}$, indicated by the curve 27, is applied at which the quantity of light transmitted through the liquid crystal capacitor $C_{LC1}$ is saturated, the quantity of transmitted light through the liquid crystal capacitor $C_{LC2}$ rises as indicated by the curve 28, and when a voltage $V_{t3}$, indicated by the curve 28, is applied at which the quantity of transmitted light through the liquid crystal capacitor $C_{LC2}$ is saturated, the quantity of transmitted light through the liquid crystal capacitor $C_{LC3}$ rises as indicated by the curve 29.

Let it be assumed, for example, in the FIG. 4 embodiment that a voltage Vd, at which the quantity of transmitted light is intermediate between its rise and saturation, for example, 50%, is being applied as the drive voltage Va to the subpixel electrode $4_1$ from the thin film transistor 8. In this instance, the liquid crystal molecules are oriented obliquely to the substrates in the region corresponding to the subpixel electrode $4_1$, whereas in the regions corresponding to the gap GP and the subpixel electrode $4_2$ the liquid crystal molecules are oriented parallel to the substrates. As is evident from the equivalent circuit depicted in FIG. 6, when the control capacitor, for example, $C_{C1}$, is shorted, the voltage Vd is applied to the liquid crystal capacitor $C_{LC2}$ as well, and the voltage $V_3'$, which is applied to the liquid crystal capacitor $C_{LC3}$ is expressed as follows, by substituting infinity for $C_{C1}$ in Eq. (2).

$$V_3' = \frac{Va}{\frac{C_{LC3}'}{C_{C2}} + 1} \quad (3)$$

Since the voltage $V_2$ which is applied to the liquid crystal capacitor $C_{LC2}$ becomes equal to the voltage Va, the operation curve 28 in FIG. 7 shifts to the position of the operation curve 27. Since the voltage $V_3'$ which is applied to the liquid crystal capacitor $C_{LC3}$ becomes higher than the voltage $V_3$ in the case of no short, as seen from Eq. (3), the operation curve 29 in FIG. 7 shifts to the vicinity of the curve 28. Thus, although the liquid crystal molecules are oriented obliquely in the region corresponding to the gap GP as well, the liquid crystal molecules are still oriented in parallel to the substrates in the region corresponding to the subpixel electrode $4_2$, because the voltage $V_3'$ which is provided to the subpixel electrode $4_2$ can be controlled to stay below the threshold voltage $V_{t2}$. In this way, the area over which the liquid crystal molecules are oriented obliquely to the substrates increases, and consequently, the quantity of transmitted light over the entire pixel region increases accordingly, but it is possible to prevent the liquid crystal molecules from being oriented obliquely over the entire region of the pixel. In other words, the reduction of the optimum visual angle and an increase in the quantity of transmitted light, which are caused by shorting of the control capacitor, are less than in the case of FIG. 1.

When the control capacitor $C_{C2}$ is shorted, the liquid crystal capacitors $C_{LC2}$ and $C_{LC3}$ are connected in parallel as seen from FIG. 6, and a voltage $V_3''$ which is provided to the liquid crystal capacitor $C_{LC3}$ is given as follows, by substituting infinity for $C_{C2}$ in Eq. (2).

$$V_3'' = \frac{Va}{\frac{C_{LC2} + C_{LC3}'}{C_{C1}} + 1} \quad (4)$$

As is evident from Eq. (4), the voltage $V_3''$ becomes higher than the voltage $V_3$ in the case of no short-circuit, t, and in this case, the operation curve 29 in FIG. 7 shifts to the vicinity of the curve 28 (which also slightly shifts to right), but since the voltage $V_3''$ which is provided to the subpixel electrode $4_2$ and the control capacitor electrode 2 still remains below the threshold voltage $V_{t2}$, the display in these regions will not change.

When viewed from the outside of the optimum visual angle, the lightness and contrast of a display on the liquid crystal display panel differ from the lightness and contrast of the display viewed from the inside of the optimum visual angle. In a liquid crystal display panel adapted for color display (in which pixels are each provided with red, green and blue color filters), the above-said change in lightness and contrast appears as a change in the color and saturation of the display, in particular, and hence is remarkably noticeable. Hence, in a liquid crystal display panel of our prior U.S. Pat. No. 5,245,450 as shown in FIG. 1, a short of the control capacitor changes the color and saturation of the display over the entire pixel region, and this is perceived as an apparent pixel defect. In contrast thereto, for example, in the FIG. 4 embodiment, even if one of the control capacitors is shorted, the subpixel electrodes $4_1$ and $4_2$ are capacitively coupled by the other control capacitor. As the result of the short, the control capacitor electrode 2 and one of the subpixel electrodes $4_1$ and $4_2$ are connected and the area of the subpixel electrode increases equivalently. In the gray-level display, however, the region over which the liquid crystal molecules are oriented obliquely is either one of the subpixel electrodes of the increased area and the other subpixel electrode, and there is less possibility that the liquid crystal molecules are oriented obliquely over the entire pixel region. Thus, the visual angle dependence of the display is small, and even if the panel is applied to a color display, changes in the color and saturation are small. Moreover, in the embodiment of FIGS. 4 and 5 the drain electrode 8D of the thin film transistor 8 and the subpixel electrode $4_1$ are formed in the same plane on the insulating layer 15 and are connected directly to each other—this precludes the necessity of making such a contact hole as shown in FIG. 2 in the insulating layer 15, and hence reduces the number of steps involved in the manufacture of the liquid crystal display panel accordingly.

Figure 8:
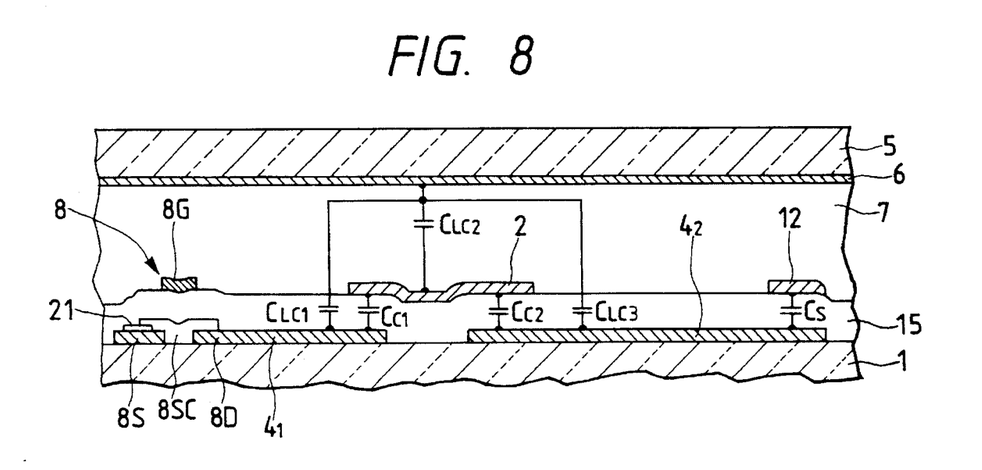
FIG. 8 is a sectional view, corresponding to FIG. 5, illustrating a modified form of the FIG. 5 embodiment.

While in the above embodiment the control capacitor electrode 2 is provided on the side of the first insulating layer 15 near the substrate 1 and the subpixel electrodes $4_1$ and $4_2$ are on the other side of the first insulating layer 15 opposite from the substrate 1, their positions may also be exchanged as shown in section in FIG. 8 corresponding to FIG. 5. That is, in the FIG. 8 embodiment the electrodes 2, $4_1$ and $4_2$ are identical in shape with those in FIG. 4 embodiment, but the subpixel electrodes $4_1$ and $4_2$ are deposited on the inside of the substrate 1 and the source and drain electrodes 8S and 8D of the thin film transistor 8 are also formed on the same interior surface of the substrate 1 as the subpixel electrodes $4_1$ and $4_2$ are provided, the drain electrode 8D being connected directly to the subpixel electrode $4_1$. The first insulating layer 15 serves also as the gate insulating film of the thin film transistor 8. On the top of the first insulating layer 15 there are deposited the control capacitor electrode 2, the gate electrode 8G of the thin film transistor 8 and the additional capacitor electrode 12. In this embodiment the entire region of the control capacitor electrode 2 functions as one subpixel electrode, but as in the embodiment of FIGS. 4 and 5, the control capacitor electrode 2 connects the subpixel electrodes $4_1$ and $4_2$ in series to each other via the control capacitors $C_{C1}$ and $C_{C2}$. Hence, the equivalent circuit of the pixel is the same as shown in FIG. 6 and the same results as those obtainable with the embodiment of FIGS. 4 and 5 can be obtained.

Figure 9:
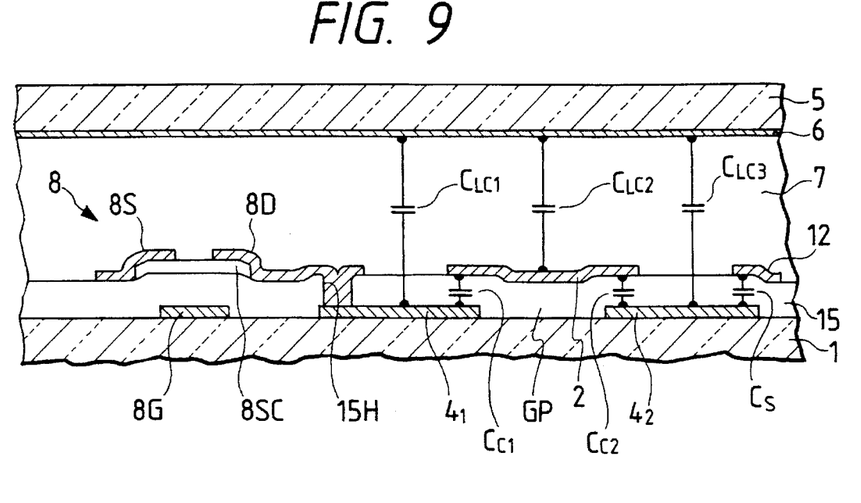
FIG. 9 is a sectional view illustrating a modification of the FIG. 8 structure which employs what is called a gate bottom type thin film transistor.

Although the foregoing embodiment have each been described to as employing what is called a gate top type thin film transistor, it is evident that a so-called gate bottom type thin film transistor may also be used. FIG. 9 shows, in section, an example in which the gate bottom type thin film transistor is used in the structure of the FIG. 8 embodiment, the parts corresponding to those in FIG. 8 being identified by the same reference numerals and characters. As depicted in FIG. 9, the gate electrode 8D of the thin film transistor 8 is formed between the substrate and the insulating layer 15 in the same manner as the subpixel electrodes $4_1$ and $4_2$, and the semiconductor layer 8SC is formed on the insulating layer 15 in opposing relation to the gate electrode 8G, the insulating layer 15 serving also as a gate insulating film. Further, the source electrode 8S and the drain electrode 8D are formed partly overlapping opposite marginal portions of the semiconductor layer 8SC, and the drain electrode 8D is connected to the subpixel electrode $4_1$ through the contact hole 15H made in the insulating layer 15. The display panel of this example is identical in construction with the FIG. 8 embodiment except for the above. The control capacitor electrode 2 is formed on the insulating layer 15 so that it covers the entire area of the gap GP and overlaps the subpixels $4_1$ and $4_2$ over predetermined areas. Thus, the equivalent circuit of the pixel in this example is the same as shown in FIG. 6, as is the case with the FIG. 8 embodiment, and it is evident that the construction of this example brings about the same effect obtainable with the embodiment depicted in FIGS. 4 and 5. It is also possible, in this embodiment, to form the control capacitor electrode 2 between the insulating layer 15 and the substrate 1 and provide the subpixel electrodes $4_1$ and $4_2$ on the insulating layer 15, as in the case of FIG. 5 embodiment. In such a case, the contact hole 15H need not be made in the insulating layer 15 and the drain electrode 8D can be connected directly to the subpixel electrode $4_1$, and consequently, the number of manufacturing steps of the display panel decreases accordingly.

Figure 10:
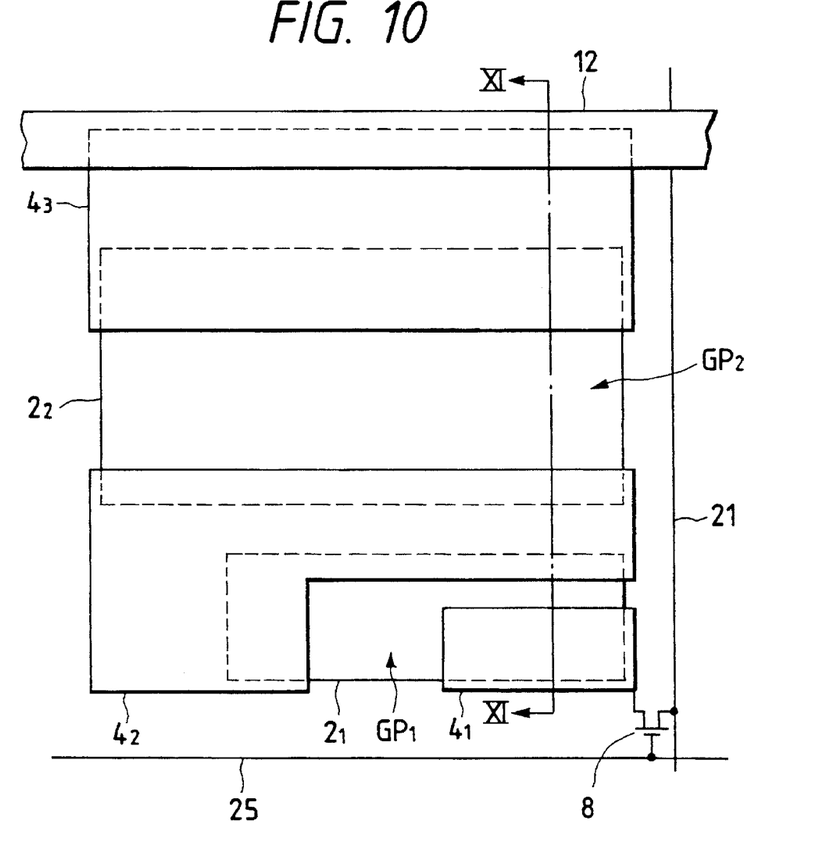
FIG. 10 is a plan view of one pixel in another embodiment of the present invention.
Figure 11:
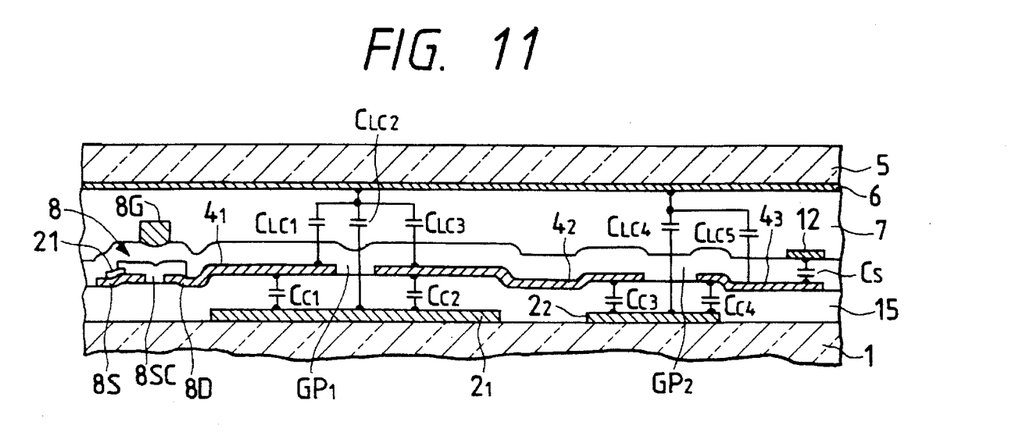
FIG. 11 is a sectional view taken on the line XI—XI in FIG. 10.
Figure 12:
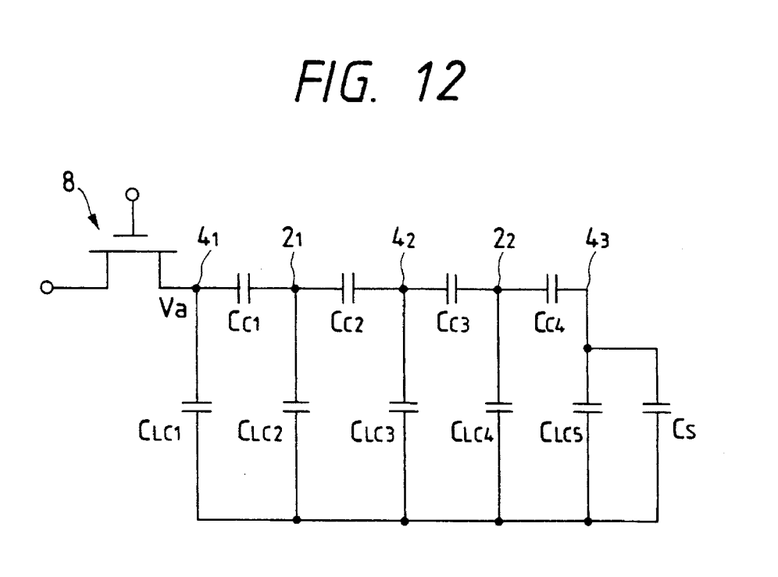
FIG. 12 is a diagram showing an equivalent circuit of the pixel depicted in FIG. 10.

Although the present invention has been described above as being applied to a pixel structure which can be driven at three levels one after another through use of the two subpixel electrodes $4_1$ and $4_2$ and the one control capacitor electrode 2, it is also possible to increase the number of pixel driving levels by using more control capacitor electrodes and subpixel electrodes on the basis of the principle of the present invention. FIGS. 10 and 11, corresponding to FIGS. 4 and 5, illustrate another embodiment which employs two control capacitor electrodes and three subpixel electrodes in the pixel structure shown in FIGS. 4 and 5, and FIG. 12 shows its equivalent circuit. In this embodiment subpixel electrodes $4_1$, $4_2$ and $4_3$ are separated by gap regions $GP_1$ and $GP_2$, respectively, and control capacitor electrodes $2_1$ and $2_2$ are provided which cover the gap regions $GP_1$ and $GP_2$ and overlap adjacent subpixel electrodes over desired areas across the first insulating layer 15. With this structure, the subpixel electrodes $4_1$, $4_2$ and $4_3$ are capacitively coupled in parallel via control capacitors $C_{C1}$, $C_{C2}$, $C_{C3}$ and $C_{C4}$ one after another, forming liquid crystal capacitors $C_{LC1}$, $C_{LC3}$ and $C_{LC5}$ between them, and the common electrode 6 opposite thereto, respectively. The control capacitor electrodes $2_1$ and $2_2$ also form liquid crystal capacitors $C_{LC2}$ and $C_{LC4}$ between them and the common electrode 6 in the gap regions $GP_1$ and $GP_2$, respectively. As can be seen from the equivalent circuit depicted in FIG. 12, the drive voltage Va, which is applied via the thin film transistor 8, is provided directly to the liquid crystal capacitor $C_{LC1}$ and sequentially lower voltages, which are provided by the capacitance division of the drive voltage Va, are applied to the liquid crystal capacitors $C_{LC2}$ through $C_{LC5}$, respectively. This permits driving of the pixel region at five levels. It can readily be understood that the capacitance-divided voltages, which are applied to the liquid crystal capacitors $C_{LC2}$ through $C_{LC5}$, can be chosen as desired by a suitable selection of the areas of the subpixel electrodes overlapping the control capacitors $2_1$ and $2_2$.

While in the above the present invention has been described as being applied to the light transmitting type liquid crystal display panel, it will be seen that the invention is also applicable to a light reflecting type liquid crystal panel wherein each control capacitor electrode and each subpixel electrode are formed by metal layers.

As is evident from the above, according to the present invention, a plurality of subpixel electrodes, separated by a gap region, are provided on one side of an insulating layer and at least one control capacitor electrode is provided on the other side of the insulating layer in such a manner that it covers the gap region and overlaps the adjacent but spaced subpixel electrodes over predetermined areas thereof. Moreover, the entire pixel region is covered with the subpixel electrodes and the control capacitor electrode. Thus, the entire pixel region functions as a display-enable region, and hence this pixel structure has a high aperture ratio.

As can be seen from comparison of the structures shown, for example, in FIGS. 5 and 8, there is no substantial distinction between the subpixel electrodes and the control capacitor electrodes in the present invention. The most striking feature of the present invention resides in the construction wherein a plurality of series-connected control capacitors are provided and a liquid crystal capacitor is connected to one end of each control capacitor, as depicted in the equivalent circuit of FIG. 6 or 12. This construction differs entirely from the construction set forth in our aforementioned prior U.S. patent which is represented by an equivalent circuit wherein a plurality of series-connected pairs of control capacitors and liquid crystal capacitors are connected in parallel.

Having thus described our invention.

We claim:

1. A gray-scale liquid crystal display panel comprising first and second transparent substrates disposed in parallel with liquid crystal interposed therebetween, said first substrate having an interior surface on which a plurality of pixels are arranged in a matrix form, a plurality of thin film transistors connected to said pixels, respectively, source lines connected to sources of said thin film transistors of each column of said matrix to apply thereto a drive voltage and gate lines connected to gates of said thin film transistors of each row of said matrix to apply thereto a gate signal for ON-OFF control thereof, said second substrate being coated all over its interior surface with a transparent common electrode opposite all of said pixels, each of said pixels comprising:

a transparent insulating layer formed on said first substrate;

at least first and second subpixel electrodes formed on one side of said insulating layer, said first and second subpixel electrodes being separated by a gap;

a drain electrode of the thin film transistor corresponding to said each pixel being formed on said insulating layer at the side opposite from said first and second subpixel electrodes and electrically connected directly to said first subpixel electrode through a contact hole made in said insulating layer; and at least one control capacitor electrode formed on the other side of said insulating layer, covering substantially the entire area of said gap and overlapping said first and second subpixel electrodes across said insulating layer over predetermined areas thereof to form first and second control capacitors, one side of said first control capacitor being connected to said drain electrode, the other side of said first control capacitor being connected to one side of said second capacitor, and the other side of said second control capacitor being connected to said second subpixel electrode.

2. A gray-scale liquid crystal display panel comprising first and second transparent substrates disposed in parallel with liquid crystal interposed therebetween, said first substrate having an interior surface on which a plurality of pixels are arranged in a matrix form, a plurality of thin film transistors connected to said pixels, respectively, source lines connected to sources of said thin film transistors of each column of said matrix to apply thereto a drive voltage and gate lines connected to gates of said thin film transistors of each row of said matrix to apply thereto a gate signal for ON-OFF control thereof, said second substrate being coated all over its interior surface with a transparent common electrode opposite all of said pixels, each of said pixels comprising:

a transparent insulating layer formed on said first substrate;

at least first and second subpixel electrodes formed on the side of said insulating layer near said first substrate, said first and second subpixel electrodes being separated by a gap;

a drain electrode of the thin film transistor corresponding to said each pixel being electrically connected directly to said first subpixel electrode; and at least one control capacitor electrode formed on the other side of said insulating layer, covering substantially the entire area of said gap and overlapping said first and second subpixel electrodes across said insulating layer over predetermined areas thereof to form first and second control capacitors, one side of said first control capacitor being connected to said drain electrode, the other side of said first control capacitor being connected to one side of said second control capacitor, and the other side of said second control capacitor being connected to said second subpixel electrode.

* * * * *